Feb. 5, 1952     F. N. GILLETTE     2,584,265
FILM TO TELEVISION TRANSLATOR
Filed May 10, 1949     2 SHEETS—SHEET 1
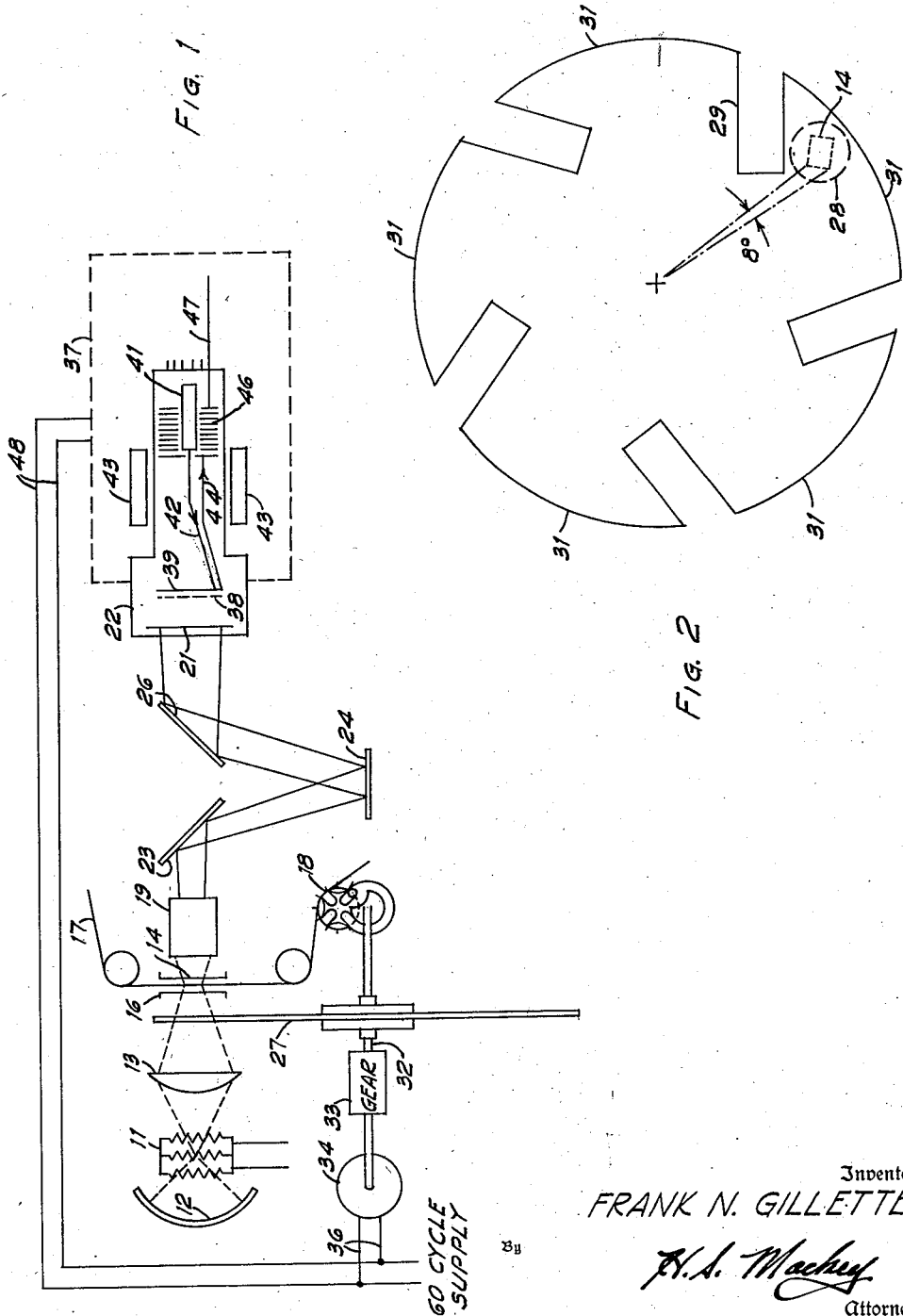
Inventor
FRANK N. GILLETTE
Attorney

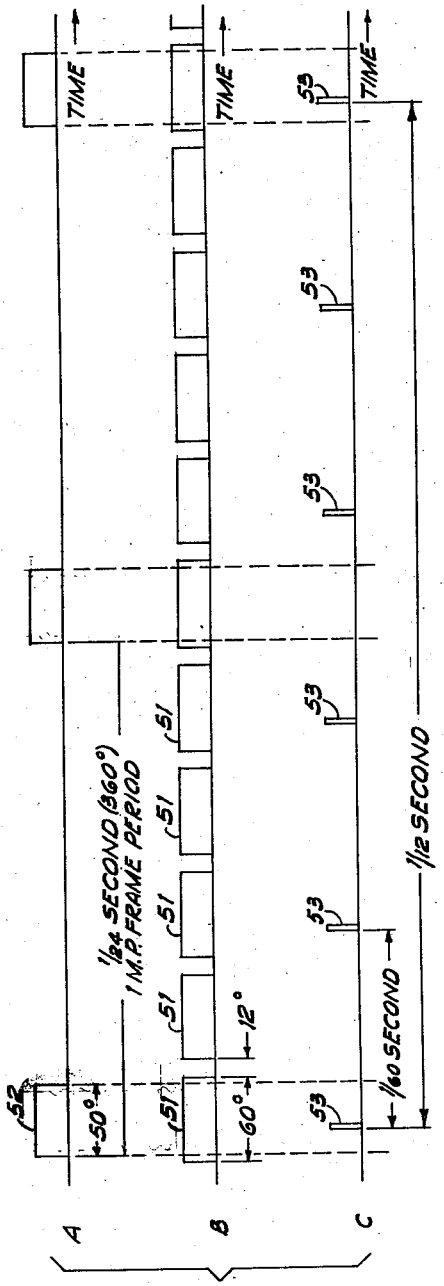
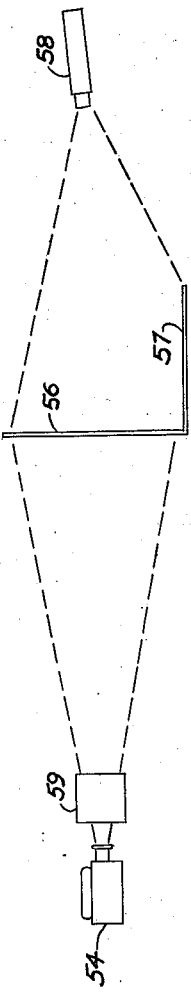
Fig. 3
Fig. 4
Inventor
FRANK N. GILLETTE

Patented Feb. 5, 1952

2,584,265

UNITED STATES PATENT OFFICE 2,584,265

FILM TO TELEVISION TRANSLATOR

Frank N. Gillette, Pleasantville, N. Y., assignor to General Precision Laboratory Incorporated, a corporation of New York Application May 10, 1949, Serial No. 92,343

12 Claims. (Cl. 178—7.2)

This invention pertains to a film to television translator and particularly to means for reproducing the images recorded on motion picture films as a train of television signals utilizing standard motion picture projection apparatus and standard television camera apparatus.

In standard motion picture projectors, the motion picture film is intermittently advanced or pulled down through a film gate and past a projection aperture at a rate of 24 picture frames per second. During the interval that the film is moving, or the pulldown period, light projection through the film and aperture is cut off by a shutter so that the photographic image on any selected frame is transmitted only during the period when that frame is stationary at the projection aperture. The shutter which performs this function of interrupting the light at the proper time operates at the same speed as the intermittent mechanism and thus whether of the disc, cone or drum type is rotated at a speed of 24 revolutions per second or at 1440 R. P. M. by a synchronous motor and suitable gearing, the motor being energized by the usual 60 C. P. S. alternating current mains. Of course the shutter may, and usually does, have two opaque and two transparent portions so that the light is actually interrupted 48 times per second and flicker is not perceptible to the eye but for present purposes only the interruption of light during the pulldown period is of importance. The standards therefore, are such as to require the projection of 24 picture frames each second necessitating the use of a motor, suitable gearing and drive shafts such that the shutter and intermittent mechanism operate at a speed of 1440 R. P. M.

On the other hand the present standard for television transmissions requires a picture frequency of 30 per second, interlaced scanning being usually employed so that each picture is scanned twice resulting in a scanning frequency of 60 television scans per second. This apparatus is also ordinarily powered from the usual 60 cycle source.

It is the conversion from the standard of 24 motion pictures per second to the standard of 60 television scans per second, a ratio of 2 to 5, which in the past has led to considerable difficulty and which has required complex and specialized equipment of high precision.

In one method of televising film the motion picture film strip is run through a special projector at a steady and uninterrupted rate of 24 frames per second. A scanning wheel containing apertures, mirrors or lenses is rotated between the film strip and a television camera in such a way that the screen within the pickup tube of the camera is illuminated by a stationary image, the motion of the scanning wheel neutralizing and cancelling the effect of the motion of the film. Each film frame is thus projected on the pickup tube, and in fact each frame is projected several times in order to secure a projection frequency which is the least common multiple of the motion picture and the television frequencies, thus reconciling their disparity.

Although this system has been successfully demonstrated, it requires a large quantity of special equipment which has to be highly precise both optically and mechanically, and because the system requires a non-storage type of pickup tube it demands several hundred times as much light as schemes employing storage type tubes.

In another system of motion picture televising, use is made of the vertical blanking time of the television pick-up tube. The electron scanning beam within a pick-up tube, after scanning the screen or mosaic from top to bottom, is extinguished and while extinguished returns to the top of the screen to repeat the process. This cycle of the vertical scan occurs once each 1/60 second, of which 5% to 8% is consumed by the blanking time. The system is arranged so that the screen is illuminated only during each blanking period and is not illuminated during the remaining time of electronic scanning. In employing this method with 35 mm. projectors, which may have for example a pull-down time of 122°, periodic pull-downs cannot be employed because every fifth illumination of the television camera would be cut off by the projector shutter, and this would impose a 12-cycle flicker on the viewed television picture. However, if the projector intermittent mechanism is arranged for aperiodic operation so that the camera is illuminated twice during one frame of the film strip and three times during the succeeding frame, the pulldown periods will fall between the television blanking periods and the camera will secure illumination during every television vertical blanking period.

The asymmetrical intermittent mechanism required for this system of motion picture television is intricate in design and requires skill of the highest order in its construction, so that this system is expensive to construct and difficult to maintain. It also requires a fairly intense light source because the camera can be illuminated only during the short period of vertical blanking.

In a third system of motion picture televising, use is again made of the television blanking time for illumination of the pick-up tube screen. A fast intermittent mechanism having considerably less than 90° pull-down angle is employed, with the result that the television vertical blanking periods are fitted into the light projection periods in such a way that light is received on the pick-up tube screen during each and every vertical blanking period. A shutter is arranged so that the projected light image is cut off during each entire electronic scan period. In this system the motion picture intermittent mechanism has a periodic and symmetrical motion, although alternate motion picture frames are televised three times while remaining frames are televised but twice each. The motion picture shutter consists of a disc having a single aperture and rotated at 3600 R. P. M. by a separate motor. This motor is inherently synchronized with the television pick-up tube scanning mechanism by operation of both motor and tube from the same alternating power mains, and the motor must in addition be accurately phased with the television set. To permit such phasing, the motor field structure is made adjustable. By rotation of this structure relative to the base the phase of the motor shaft angular position can be changed so that the time when the shutter aperture permits the projector light beam to illuminate the television pick-up tube precisely coincides with the time of the television vertical blanking period. Provision must be made to prevent hunting and consequent momentary phase shifts of this motor, because the phase relation between the projector shutter and the television camera must be maintained with great accuracy.

This method of television of motion pictures is simpler than many of the others, yet it requires the addition of an extra motor to the motion picture projector, and like all other previously existing film televising systems it requires phasing between the motion picture shutter and the television camera. Likewise, the duration of illumination is confined to the television blanking period, so that the light source is required to be about 20 times as intense as would be required if the television pick-up tube could be illuminated continuously.

In contrast the instant invention utilizes standard motion picture projection apparatus operated at standard shaft speeds and requires only that such apparatus have incorporated therein an intermittent mechanism which has a fast pull-down and that a shutter which interrupts the light at a rate of 120 times a second be substituted for the conventional shutter. With these changes which are easily and economically made and the use of a television camera pick-up tube of the photoemissive electron multiplier type a system is provided which although simple and economical is at the same time at least the equal in performance of any of the more complex systems heretofore used.

Additionally the instant invention eliminates the requirement for phasing the motion picture projector shutter with the television camera, such as is necessary in all previous systems and which has heretofore constituted a problem difficult of solution requiring special and costly equipment.

This invention may be better understood from the following detailed description and the accompanying drawing in which:

Figure 1 is a schematic representation of the essential parts of the mechanism of the invention.

Figure 2 is a drawing of the shutter disc employed in the system of Fig. 1.

Figure 3 is a chart illustrating the time relations of the various operations of the system of Fig. 1.

Figure 4 is a sketch depicting a television stage with its background scene furnished by a motion picture projection.

Referring now to Fig. 1, a light source 11 emits light which is reinforced by a reflector 12 and is focused by a condensing lens 13 to illuminate an aperture 14. A film gate 16 is arranged to position a motion picture film strip 17 at the aperture 14 so that a picture frame of the film is illuminated by the light from the source 11. An intermittent mechanism 18 is arranged to pull the film down intermittently so that successive frames thereof are momentarily stationary in the aperture frame. A projection lens 19 focuses the film on a screen 21 contained within a pick-up tube 22. Between the tube 22 and the lens 19 an arrangement of three mirrors 23, 24 and 26 is interposed to reverse the beam vertically so that the top of the light image impinges on the bottom of the screen and vice versa, while horizontally the image is not reversed.

The light is cut off during pull-down by a shutter consisting of a disc 27 having five slots in its periphery. This disc is illustrated in Fig. 2, with the projector light beam shown in cross section by dashed lines at the reference character 28 and with one slot 29 illustrated in a position prior to its rotation before the light beam. The five equal lobes 31 are made large enough in angular width so that any one of them can cut off the light beam for a time equal to the film pull-down time. Returning to Fig. 1, the disc shutter 27 is fastened to a shaft 32. This shaft is rotated through a reduction gear 33 by a synchronous motor 34 operated from a 60 cycle electric power circuit through conductors 36. The motor speed and gear reduction ratio are so designed as to rotate the shaft 32 at 1440 revolutions per minute (24 per second) and this shaft drives the intermittent mechanism 18 which therefore pulls the film down intermittently at the cyclic rate of 24 per second. Since the shutter disc 27 is mounted directly on the 1440 R. P. M. shaft 32, this disc also rotates at the rate of 1440 revolutions per minute or 24 per second. The position of the disc 27 on the shaft 32 is such that the phase of the disc is fixed in relation to the phase of the intermittent mechanism 18 at such a point that pull-down occurs while one of the masking lobes or blades 31 (Fig. 2) cuts off the passage of light through the film. However, since these lobes 31 are five in number, the light is also cut off four additional times during each frame period or five times in all, equally spaced, the light thus being periodically interrupted at the rate of 120 times per second.

The television camera pick-up tube is a part of and is physically positioned within a television camera which, being only an associated part of the equipment of this invention and which may be of any suitable design, is simply indicated by the dashed outline 37. The pick-up tube is a picture storage or scanning tube of the photoemissive electron multiplier type such as the tube commonly known as the image orthicon. It contains a photosensitive screen 21 which when activated by light falling on its outer surface emits electrons. These travel away from the opposite or inner surface in straight parallel paths, pass through a metal screen 38 and fall on a second screen 39. This screen is effectively electrically conductive in the direction of its thickness and nonconductive in other directions during time periods of the magnitude of 1/30 second, and is capable of being point-charged throughout its surface by the electron stream from screen 21 and of holding these charges for 1/30 second. The electron stream from the photosensitive screen 21 reproduces, by variations in its density throughout its cross-section, all variations in light intensity across the area of the light image actuating the screen, and this electron stream in turn produces a charge pattern on the screen 39 which thus also faithfully reproduces the picture in its variation over the surface. The metal screen 38 serves as a condenser reference plate and as a collector for secondary electrons. An electron gun 41 projects a stream of electrons 42 toward the screen 39 and a set of magnetic deflection coils 43 periodically deflects the electron stream 42 vertically and horizontally so as to scan the screen from bottom to top 60 times per second and from right to left of the scanned face of the screen 525 times during each two vertical scans. When the electron stream 42 strikes the screen 39 the charge at the point of impact is neutralized and the remainder of the beam is reversed as the electron stream 44 which has a strength proportional to that of the original stream less the amount necessary to neutralize the charge. The reverse stream 44 strikes an electron multiplier 46 which multiplies the magnitude of the electron current and delivers to succeeding equipment in the television camera through conductor 47 an amplifier electrical energy which is representative in its momentary energy variations of the area variations of the scanned picture. A tube of this type has the unique property of delivering an output signal which is substantially independent of the illumination condition on an element of the screen 21 at the instant when the corresponding element of the screen 39 is being scanned by the electron beam 42. The output signal is therefore determined only by the history of this element of screen 39 during the preceding 1/30 second and is practically unaffected by the exposure of the corresponding element of the screen 21 to full light or no light at the instant of scanning.

This property of the pick-up tube constitutes the basis on which the operation of the instant invention is predicated since it permits the light image to be directed on the camera tube screen either during vertical blanking or at any other time and so eliminates any requirement for phasing of the shuttering motion of the disc 27 to the scanning motion of the electronic stream 42. This scanning motion of the electronic stream 42 is, however, synchronized to the projector by operation through conductors 48 from the same 60 cycle source 49 that operates the motor 34.

The optics of a pick-up tube are ordinarily designed for use of a simple objective lens in front of the tube. This lens inverts the image of the subject as cast on the screen 39, so that as observed from the electron gun the top becomes the bottom and the right of the subject appears at the left. It therefore is necessary, in order to produce signals representing scans of the subject from top to bottom and from left to right, to design the movement of the electronic scanning beam so that the scanned surface of the screen is scanned from bottom to top and from right to left and such a beam was described supra. When the lens is removed, as in the described example of equipment for the present invention, both vertical and horizontal scans become wrong in the direction of motion, but since a beam of light from a film strip is scanned from the back of what might be termed its projection screen that fact reverses the image horizontally when observed from the electron gun side of the screen, and the described mirror system completes the correction by reversing the image vertically.

Time relations in the instant invention are shown in the charts of Fig. 3. Chart A illustrates the operation of the intermittent mechanism 18, Fig. 1. The rectangle 52 has a length of 50° or 14% of a frame period and represents the period of motion of the film. During the remainder of the frame period the film is stationary and one of its pictures or frames is positioned in the film gate 16, Fig. 1, so that light from the source 11 may project an image of the picture through the aperture 14. This light is controlled by shutter 27, time relations being shown in chart B, Fig. 3, which is to the same time scale as chart A. The five periods of darkness caused by the lobes 31, Fig. 2, are represented by the five blocks 51, chart B, each of them 60° in length. This length is more than the 50° duration of pull-down plus 8° which is the angular portion of the shutter disc that is subtended by the height of the aperture 14, Figs. 1 and 2. Therefore the cutting off of the light beam can be accomplished by any one of the lobes and must be accomplished by one of them. This is indicated in charts A and B by vertical registration of the pull-down period 52 within a block 51 with more than sufficient overlap to include the 8° height of the aperture 14. This vertical registration on the charts is representative of the relation of the phase or angular position of the disc 27, Fig. 1 on its shaft 32 to the phase or angular position of the intermittent 18 on the same shaft. In chart B the 12° spaces intermediate the 60° blocks 51 represent time periods during which one of the apertures of the disc shutter, Fig. 2, is in line with the projector aperture 14, Fig. 1, permitting light to fall on the film 17. This occurs five times in each frame period so that each film picture or frame while stationary has the light beam projected through it five times. The beam is therefore projected through stationary film at the regular rate of 120 times per second.

Returning to Fig. 3, graph C depicts the vertical scanning or field periods of the television camera, each period being 1/60 second in length. The only requirement for timing of the scanning is that any element of the screen 39, Fig. 1 as it is being scanned by the electron beam 42 must have substantially the same history of energization during the preceding 1/30 second as any other element when the latter is scanned. The fact of illumination or non-illumination at the instant of scanning makes no practical difference. Therefore in graph C the times when the vertical blanking periods 53 occur have no necessary relation to the shutter-open times shown in graph B. In other words, no particular phase relation is necessary between graph B and graph C or between the camera and the shutter or intermittent mechanism. It is necessary, however, that the number of illuminations permitted by the shutter during each vertical scan of the camera be a constant whole number so that illumination periods occur at the same time within each camera vertical scan period. This requirement necessitates approximate synchronism of the shutter speed and camera speed. This is of course automatically accomplished in the described equipment by the operation of both shutter and camera from the same 60 cycle electrical supply source, as described. The system of this invention will, however, tolerate sufficient asynchronism to permit operation of the projector and the camera from two separate and unsynchronized nominally 60 cycle power sources.

It is obvious that when the shutter is operated on a 1440 R. P. M. shaft no more than five lobes can be employed and satisfy all requirements, because if more than five were used the shuttering time would be less than 58°, and light would not be cut off during all of the pull-down time. Likewise no fewer than 5 lobes can be employed and satify both the shuttering and the scanning requirements. Of course any speed of the shaft driving the shutter other than 1440 R. P. M. may be employed with a corresponding change in the number of shutter lobes so as to produce 120 interruptions per second, without changing the operating results. The employment of a 1440 R. P. M. shaft is, however, of the greatest practical importance because such a shutter shaft is found in many standard projectors, so that the only modification of such projectors for the purposes of this invention is the substitution of a 5 lobe shutter disc for a 2 lobe disc, a simple mechanical operation.

No change whatever is required in television cameras equipped with image orthicon pick-up tubes except to remove the lens if the camera has one, and to equip the camera with light-reversing equipment such as the described mirrors. Of course, such reversing equipment may as well be made a part of the projection lens of the projector, or may be a separate unit introduced between the projector and the camera.

On the other hand instead of employing light-reversing mirrors, the connections of the vertical deflection coils of the pick-up tube can be reversed. As a result, the tube will scan from top to bottom of the screen 39, and the television video signal will properly represent the subject by vertical top to bottom scans and horizontal left to right lines, it being a mere matter of choice of whether the projection equipment or the television camera equipment is to be altered to this slight extent.

The instant invention also finds utility in television systems wherein the background such as an outdoor scene is to be supplied by images previously recorded on photographic film while the foreground is represented by live actors in a studio. In order to accomplish this result, a motion picture screen is illuminated by the desired background scene projected upon it by a motion picture projector, live actors act before the screen, and a television camera simultaneously televises both the actors and the background scene. Such an arrangement is illustrated in Figure 4 in which a projector 54 projects a scene on a motion picture screen 56, actors play on the stage 57, and both background screen and action are televised by the television camera 58. Obviously the same problem arises here as in the case of directly televising the light beam of a projector, and it is necessary that the projector be of a type such as that described supra in order to be able to televise the projected background scene. The projector 54 of Figure 4 therefore represents the projector of this invention and the camera 58 represents a television camera including the usual lens. It follows that the projected background, as seen from the televised side, is reversed horizontally, being viewed through the translucent screen, and horizontal reversing mirrors or an equivalent device must be inserted at either the projector or the camera. In Figure 4 the three reversing mirrors 23, 24 and 26 of Fig. 1, rearranged to reverse in a horizontal sense, are represented by the rectangle 59.

Instead of the employment of reversing mirrors the camera circuit may be modified to reverse the connections to the horizontal scan coils, so that the electronic beam within the camera scans its screen 39, Fig. 1, from left to right. Of course the background image may be projected from the front, in which case no reversing mirrors are necessary and no changes of camera wiring are required.

What is claimed is:

1. A film to television translator comprising, a television camera including a television pick-up tube of the image orthicon type translating picture images to electrical signals at one rate of picture recurrence, a motion picture projector including means for intermittently advancing a film strip having photographic picture frames thereon at a different rate of picture recurrence, means for projecting the light images produced by said motion picture projector, means for impressing said projected image on said television pick-up tube, and light interrupting means driven in synchronism with said means for intermittently advancing said film strip for interrupting the light images produced by said motion picture projector at a rate of recurrence which is equal to the least common multiple of said first and second mentioned rates of picture recurrence.

2. A film to television translator comprising, a television camera including a television pick-up tube of the image orthicon type translating picture images to electrical signals at one rate of picture recurrence, a motion picture projector including an intermittent mechanism for intermittently advancing a film strip having photographic picture frames thereon at a different rate of picture recurrence, means for projecting the light images produced by said motion picture projector, means for impressing said projected images on said television pick-up tube, a shutter for interrupting the light images produced by said motion picture projector, driving means operating said shutter and intermittent mechanism in synchronism and at a common speed of rotation, said shutter being provided with such number of light interrupting portions that the light images produced by said motion picture projector are interrupted at a rate of recurrence which is equal to the least common multiple of said first and second mentioned rates of picture recurrence.

3. A film to television translator comprising, a television camera including a television pick-up tube of the image orthicon type translating picture images to electrical signals at one rate of picture recurrence, a motion picture projector including an intermittent mechanism for intermittently advancing a film strip having photographic picture frames thereon at a different rate of picture recurrence, means for projecting the light images produced by said motion picture projector, means for impressing said projected images on said television pick-up tube, a shutter for interrupting the light images produced by said motion picture projector, a drive shaft common to said shutter and said intermittent mechanism whereby said shutter and intermittent mechanism are operated at the same speed of rotation, said shutter being provided with such number of light interrupting portions that the light images produced by said motion picture projector are interrupted at a rate of recurrence which is equal to the least common multiple of said first and second mentioned rates of picture recurrence.

4. A film to television translator comprising, a television camera including a photoemissive electrostatic storage pick-up tube translating picture images to electrical signals at one rate of picture recurrence, a motion picture projector including means for intermittently advancing a film strip having photographic picture frames thereon at a different rate of picture recurrence, means for projecting the light images of said picture frames, means for impressing said projected images on said photoemissive pick-up tube and means for interrupting the light images of said picture frames at rate of recurrence which is equal to the least common multiple of said first and second mentioned rate of picture recurrence.

5. A film to television translator comprising, a television camera including a photoemissive electrostatic storage pick-up tube translating picture images to electrical signals at one rate of picture recurrence, a motion picture projector including an intermittent mechanism for intermittently advancing a film strip having photographic picture frames thereon at a different rate of picture recurrence, means for projecting the light images of said picture frames, means for impressing said projected images on said photoemissive pick-up tube, a shutter for interrupting the light images of said picture frames, driving means operating said shutter and intermittent mechanism in synchronism and at a common speed of rotation, said shutter being provided with such a number of light interrupting portions that the light images of said picture frames are interrupted at a rate of recurrence which is equal to the least common multiple of said first and second mentioned rates of picture recurrence.

6. A film to television translator comprising, a television camera including a photoemissive electrostatic storage pick-up tube translating picture images to electrical signals at one rate of picture recurrence, a motion picture projector including an intermittent mechanism for intermittently advancing a film strip thereon at a different rate of picture recurrence, means for projecting the light images of said picture frames, means for impressing said projected images on said photoemissive pick-up tube, a shutter for interrupting the light images of said motion picture frames, a drive shaft common to said shutter and said intermittent mechanism whereby said shutter and intermittent mechanism are operated at the same speed of rotation, said shutter being provided with such number of light interrupting portions that the light images of said picture frames are interrupted at a rate of recurrence which is equal to the least common multiple of said first and second rates of picture projection.

7. A film to television translator comprising, a cathode ray tube of the image orthicon type provided with means for converting optical images into electrical impulses at a rate of sixty television scans a second, a motion picture projector including means for imparting an intermittent movement to a film strip at a rate of twenty-four picture frames a second, means for projecting the light images produced by said film strip, means for impressing said projected light images on said cathode ray tube, a rotating light shutter positioned for interrupting the projection of said light images having five equally spaced openings separated by five equal opaque portions and driving means rotating said shutter one revolution during each picture frame period.

8. A film to television translator comprising, a cathode ray tube of the image orthicon type provided with means for converting optical images into electrical impulses at a rate of sixty television scans a second, a motion picture projector including an intermittent mechanism for imparting an intermittent movement to a film strip at a rate of twenty-four picture frames a second, means for projecting the light images of said film strip, means for impressing said projected light images on said cathode ray tube, a rotating light shutter carried by said projector for interrupting said light images having five equally spaced opaque portions separated by open portions, means for rotating said light shutter at a speed of twenty-four revolutions a second, each of said opaque portions being of such angular width that the light images of said film strip are completely interrupted during the movement of said film strip.

9. A film to television translator comprising, a cathode ray tube of the image orthicon type provided with means for converting optical images into electrical impulses at a rate of sixty television scans a second, a motion picture projector including an intermittent mechanism for imparting an intermittent movement to a film strip at a rate of twenty-four picture frames a second, means for projecting the light images of said film strip, means for impressing said projected light images on said cathode ray tube, a rotating light shutter carried by said projector, a drive shaft common to said light shutter and said intermittent mechanism whereby the speed of rotation of said light shutter is the same as the speed of operation of said intermittent, said light shutter having five equally spaced opaque portions each of which is of such angular width that at the speed of rotation of said shutter the time required for a single opaque portion to completely cover a given area is not less than the time required for the intermittent movement of said film strip, and said light shutter and intermittent mechanism being so phased relative to each other that said light images are interrupted during the movement of said film strip.

10. A film to television translator comprising, a cathode ray tube having a photosensitive screen, a target screen, the electrons produced by said photosensitive screen impinging on one surface of said target screen to cause an electrostatic charge to be stored on said target screen the distribution of which depends on the distribution of the density of the electrons emitted by said photosensitive screen, means for causing the cathode ray developed by said cathode ray tube to scan the other surface of said target screen at a rate of sixty television scans a second, a motion picture projector including means for imparting an intermittent movement to a film strip at a rate of twenty-four picture frames a second, means for projecting the light images produced by said film strip, means for impressing said projected light images on said photosensitive screen, a rotating light shutter carried by said projector having five equal opaque portions separated by five equal openings, and driving means rotating said shutter one revolution during each picture frame period.

11. A film to television translator comprising, a cathode ray tube having a photosensitive screen, a target screen, the electrons produced by said photosensitive screen impinging on one surface of said target screen to cause an electrostatic charge to be stored on said target screen the distribution of which depends on the distribution of the density of electrons emitted by said photosensitive screen, means for causing the cathode ray developed by said cathode ray tube to scan the other surface of said target screen at a rate of sixty television scans a second, a motion picture projector including an intermittent mechanism for imparting an intermittent movement to a film strip at a rate of twenty-four picture frames a second, means for propecting the light images of said picture frames, means for impressing said projected light images on said photosensitive screen, a rotating light shutter carried by said projector for interrupting said light images having five equally spaced opaque portions, means for rotating said light shutter at a speed of twenty-four revolutions per second, each of said opaque portions being of such angular width that at the speed of rotation of said shutter one of said opaque portions completely interrupts the light image during the movement of said film strip.

12. A film to television translator comprising, a cathode ray tube having a photosensitive screen, a target screen, the electrons produced by said photosensitive screen impinging on one surface of said target screen to cause an electrostatic charge to be stored on said target screen the distribution of which depends on the distribution of the density of electrons emitted by said photosensitive screen, means for causing the cathode ray developed by said cathode ray tube to scan the other surface of said target screen at a rate of sixty television scans a second, a motion picture projector including an intermittent mechanism for imparting an intermittent movement to a film strip at a rate of twenty-four picture frames a second, means for projecting the light images of said picture frames, means for impressing said projected light images on said photosensitive screen, a rotary light shutter carried by said projector, a drive shaft common to said light shutter and said intermittent mechanism whereby the speed of rotation of said light shutter is the same as the speed of operating of said intermittent, said light shutter being provided with five equally spaced opaque portions each of which is of such angular width that at the speed of rotation of said shutter the time required for a single opaque portion to completely cover a given area is not less than the time required for the intermittent movement of said film strip, and said light shutter and intermittent mechanism being so phased relative to each other that said light images are interrupted during movement of said film strip.

FRANK N. GILLETTE.

REFERENCES CITED

The following references are of record in the file of this patent:

UNITED STATES PATENTS

| Number | Name | Date |
|---|---|---|
| 2,275,898 | Goldsmith | Mar. 10, 1942 |
| 2,297,461 | Dillenburger | Sept. 29, 1942 |
| 2,305,902 | Schroeder | Dec. 22, 1942 |
| 2,312,308 | Boecking | Mar. 2, 1943 |
| 2,455,323 | Townsend | Nov. 30, 1948 |
| 2,496,102 | McCord | Jan. 31, 1950 |
| 2,517,807 | Sziklai | Aug. 8, 1950 |

FOREIGN PATENTS

| Number | Country | Date |
|---|---|---|
| 108,779 | Sweden | Oct. 19, 1943 |
| 422,034 | Great Britain | Jan. 3, 1935 |